United States Patent
Evelin et al.

(10) Patent No.: US 9,410,223 B2
(45) Date of Patent: Aug. 9, 2016

(54) PROCESS FOR TREATING LIQUID EFFLUENTS AND RECOVERING METALS

(75) Inventors: Salomão Solino Evelin, Belo Horizonte (BR); Roberto Mattioli Silva, Arax (BR); Geraldo Luiz Da Silva, Sabará (BR); Clauson De Souza, Belo Horizonte (BR)

(73) Assignee: VALE S.A., Rio de Janeiro (BR)

( * ) Notice: Subject to any disclaimer, the term of this patent is extended or adjusted under 35 U.S.C. 154(b) by 345 days.

(21) Appl. No.: 13/816,205

(22) PCT Filed: Aug. 9, 2011

(86) PCT No.: PCT/BR2011/000274
§ 371 (c)(1),
(2), (4) Date: Sep. 13, 2013

(87) PCT Pub. No.: WO2012/019265
PCT Pub. Date: Feb. 16, 2012

(65) Prior Publication Data
US 2013/0343972 A1     Dec. 26, 2013

(30) Foreign Application Priority Data
Aug. 9, 2010 (BR) .................................... 1003193

(51) Int. Cl.
*C22B 3/44* (2006.01)
*C02F 9/00* (2006.01)
*C02F 1/20* (2006.01)
*C02F 1/52* (2006.01)
*C02F 101/20* (2006.01)
*C02F 1/28* (2006.01)
*C02F 103/16* (2006.01)
*C02F 1/04* (2006.01)

(52) U.S. Cl.
CPC ... *C22B 3/44* (2013.01); *C02F 9/00* (2013.01); *C02F 1/048* (2013.01); *C02F 1/20* (2013.01); *C02F 1/283* (2013.01); *C02F 1/5236* (2013.01); *C02F 1/5272* (2013.01); *C02F 2101/20* (2013.01); *C02F 2103/16* (2013.01); *Y02P 10/234* (2015.11)

(58) Field of Classification Search
None
See application file for complete search history.

(56) References Cited

U.S. PATENT DOCUMENTS

| 7,392,848 B1 * | 7/2008 | Bader ........................... 166/371 |
| 2006/0228279 A1 | 10/2006 | Campbell et al. |
| 2007/0212765 A1 | 9/2007 | Van Krieken |
| 2009/0180945 A1 * | 7/2009 | Evelin et al. .................. 423/385 |

FOREIGN PATENT DOCUMENTS

| GB | 1520175 A | 8/1978 |
| WO | WO 2009/089613 A1 | 7/2009 |

OTHER PUBLICATIONS

International Search Report, PCT/BR2011/000274 dated Nov. 30, 2011.

* cited by examiner

*Primary Examiner* — Melissa Swain
(74) *Attorney, Agent, or Firm* — Arent Fox LLP

(57) ABSTRACT

A method for treating liquid effluents and recovering metals is described, which comprises the steps of: a) liquid effluent equalization; b) sulphide addition and precipitation of metals in the form of metal sulphides; c) solid/liquid separation of the metal sulphides produced in step (b) and formation of a metal-free liquid phase; d) addition of a 50 to 250 g/L amine solution to the liquid phase precipitating magnesium in the form of magnesium hydroxide (Mg(OH)2); and e) recovery of amine by stripping and rectification.

10 Claims, 2 Drawing Sheets

PROCESS FOR TREATING LIQUID EFFLUENTS AND RECOVERING METALS

CROSS-REFERENCE TO RELATED APPLICATIONS

This application is a National Stage entry of International Application No. PCT/BR2011/000274, filed Aug. 9, 2011, which claims priority to Brazilian Patent Application No. P1003193-6, filed Aug. 9, 2010.

The present invention refers to a process for treating liquid effluents and recovering metals with the precipitation of hydroxide of magnesium through amines, followed by regeneration of the amine and utilization of the sub-products magnesium and sulphur.

BACKGROUND

The main objectives of any method of treating liquid and solid effluents are (i) neutralizing and duly adjusting them for release and return to the environment, and (ii) obtain sub-products, recyclable, so that they may be used in the form of captive consumption and/or via commercialization to third parties.

In the exploitation of nikelferrous lateritic ores, there are several factors that influence the nickel production process by High Pressure Acid Leaching—HPAL:
- geological origin of the deposit;
- mineralogical composition of the ore;
- particle size distribution of the ore;
- operating conditions of the processing;
- arrangement of the ore preparation systems, leaching, precipitation, solvent extraction and electro-refining.

The process of high pressure acid leaching (HPAL) is recommended for predominantly limonitic ores, which have low amounts of magnesium—usually limited to 4%, maximum—because ores with high magnesium content have high consumption of sulphuric acid.

Figure 1:
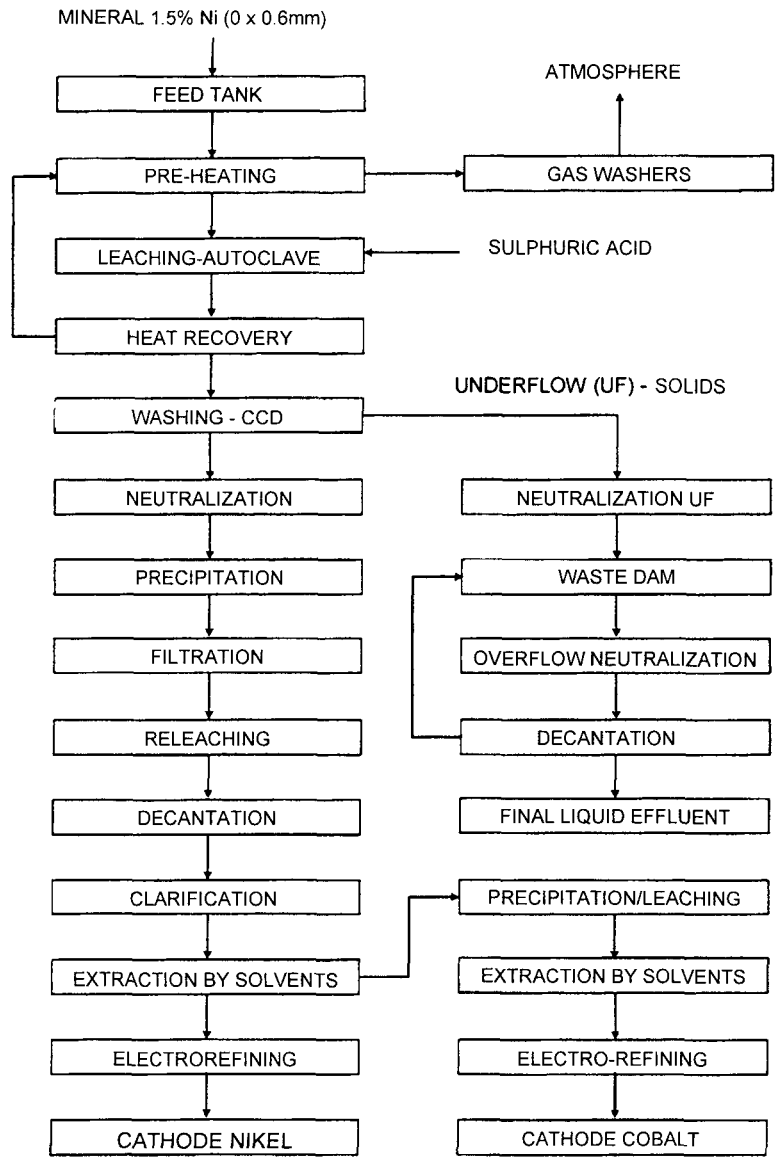

The process for production of nickel by HPAL, known in the state of the art and illustrated in FIG. 1, essentially comprises the following steps: (i) preparing the lateritic nickel ore, (ii) leaching the nickel under pressure with sulphuric acid, (iii) precipitating the nickel, (iv) re-leaching, (v) solvent extraction of the nickel and (vi) electro-refining for producing the cathode nickel (metal nickel with 99.95% purity). Due to the significant presence of cobalt in the ore, the latter will be obtained as a co-product, also in metal form.

This technology is the most appropriate process for extracting nickel and cobalt from limonitic laterites, on account of the following features:
- limonitic laterites have low magnesium content and consequently, low consumption of sulphuric acid;
- lower operating costs due to the low cost of sulphuric acid and its low specific consumption;
- no drying ore reduction stage is needed, since the gross laterite (Run of Mine—ROM) is used in the form of slurry;
- high selectivity for the metals of interest;
- sulphur dioxide emissions below environmental standards;
- recoveries over 90% for nickel and cobalt contained in the ore.

Pressure leaching generally occurs in titanium-coated autoclaves, at temperatures in the range of 245 to 270° C. In this process the slurry of the autoclave feed contains approximately 40 to 45% solids, being previously heated with steam. In some ores, due to the nature of the clayey-ores present, this concentration may be limited from 25 to 30%. The level of thickening of the slurry significantly affects the capacity of the autoclave, which comprising a rather high capital cost equipment. The leaching mechanism involves acid dissolution at high temperature of the nickel and cobalt contained in the matrix of the host minerals. Under these conditions, there occurs the dissolution of the iron minerals, followed by the formation of sulfides, which, under high temperature conditions, react with water to form hematite and, consequently, regenerate the sulphuric acid:

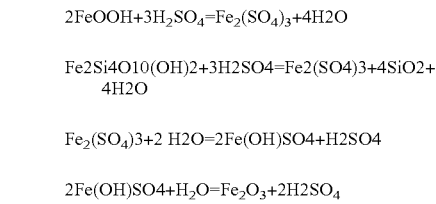

$2FeOOH + 3H_2SO_4 = Fe_2(SO_4)_3 + 4H_2O$ $Fe_2Si_4O_{10}(OH)_2 + 3H_2SO_4 = Fe_2(SO_4)_3 + 4SiO_2 + 4H_2O$ $Fe_2(SO_4)_3 + 2H_2O = 2Fe(OH)SO_4 + H_2SO_4$ $2Fe(OH)SO_4 + H_2O = Fe_2O_3 + 2H_2SO_4$

The extraction levels of this process reach values of 92 to 96% for nickel and 90 to 92% for the cobalt. Usually, to obtain this degree of extraction, the reaction slurry after the chemical attack should present a residual free acid concentration of 30 to 50 g/L.

After leaching, the slurry from the autoclave is depressurized and cooled in expansion chambers ("flash vessels"), to approximately 100° C., the remaining solids being separated from the liquid phase. Solid-liquid separation is performed in decanters operating in counter current (CCD), generating a liquor-loaded with sulfides of nickel, cobalt, magnesium, manganese, zinc, copper, iron and other metals. Nickel and cobalt present in the liquor are then precipitated as sulfides (using $H_2S$), carbonates (using ammonium carbonate) or as hydroxides, using magnesia—MgO. These intermediate products usually have contents of 55% (Ni+Co) for the case of sulfides (MSP—Mixed Sulfide Precipitate) and 40 to 45% (Ni+Co) for the case of hydroxides (MHP—Mixed Hydroxide Precipitate). It is also possible to recover these metals through solvent extraction applied directly to the liquor from the decanting system. It should be noted that the MSP process makes it possible to obtain a product with a higher content of valuable metals and lowest level of contamination of manganese, magnesium and sulfides. However, production by the MSP route involves high capital cost for auxiliary installations, since there is a need for hydrogen and hydrogen sulfide units, which require sophisticated security and handlings systems for these products.

In the following step, the refining, the intermediate products (sulfides or hydroxides of nickel and cobalt) are re-leached and thus dissolved, and undergo purification treatments, such as (i) solvent extraction for separating nickel and cobalt and (ii) electrolysis (electro-refining) to achieve higher degrees of purity.

In the nickel production process by the HPAL route, from ore containing silicates and magnesium carbonate, liquid effluent generation occurs in proportions of 250 to 400 m3/t Ni produced, essentially containing magnesium and sulfate and, in small amounts, cobalt, zinc, manganese, nickel, iron, chrome, among other elements. Table 1 presents the chemical composition of the effluent to be treated and shows the significant contents of sulfate and magnesium.

TABLE 1

Composition of the effluent to be treated

| Components | Unit | Content |
|---|---|---|
| Ni | ppm | 2.00 |
| Co | ppm | 6.00 |
| Zn | ppm | 0.90 |
| Mn | ppm | 40.00 |

TABLE 1-continued

Composition of the effluent to be treated

| Components | Unit | Content |
|---|---|---|
| Fe | ppm | 10.00 |
| Cr | g/L | 3.45 |
| Mg | g/L | 18.00 |
| S04 | g/L | 75.00 |
| NH3 | g/L | 0.50 |
| pH |  | 7.5 |

Different types of effluent treatment with steps aimed at recovering reagents used in leaching processes and/or the recovery of metals dispersed in effluents generated by liquid treatments of minerals are known in the state of the art.

In this sense, document GB 1.520.175 describes a process of recovering metals, such as, for example, magnesium, from aqueous sulfate solutions, through the use of lime or limestone for magnesium and sulfate precipitation. In this system, magnesium is complexed in the form of hydroxide, which precipitates jointly with the calcium sulfate. The reuse of these two elements, separately, is complicated, because they have fine particle size and certain similar physical properties, limiting the use of existing industrial processes of physical separation. Additionally, recovering the sulphur contained in the calcium sulfate requires complex calcination installations, requiring intensive use of energy. In this respect, there is one major drawback, from the point of view of cost, operational facility and simplicity of installation, when compared with the process that is the object of the present invention, in which the magnesium precipitation is carried out with the use of amines.

Another process known in the state of the art is described in document US 2009/0148366, which discloses a process for recovering metals and magnesium oxide from magnesium sulfate solutions. This process makes use of crystallization of magnesium sulfate by evaporation, requiring, based on the desired degree of hydration of the sulfate, that virtually all the water contained in the effluent be evaporated. This evaporation, if vacuum is used, may occur at temperatures in the range of 70° C. to 90° C. In a next step, to use the magnesium, the magnesium sulfate precipitate should be calcinated, so as to turn it into magnesium oxide. This operation must be performed at elevated temperatures, 700° C. to 800° C., which demands intense energy consumption. To recover the sulphur in the gas resulting from this calcination, sulphur dioxide, this must first be complexed to sulphur trioxide, using a bad of catalysts, for subsequent transformation into sulphuric acid. These operations must be carried out in complex and costly and sulphuric acid plants.

Another process known in the state of the art is described in document US 2009/0180945, which discloses a system for recovering magnesium and sulfate contained in effluents from acid leaching of lateritic ores under the form of magnesium hydroxide and magnesium oxide. This process uses ammonia as precipitation agent, the sulphur being recovered in the form of ammonium sulfate. The use of ammonia major great drawback in relation to the process that is the object of the present invention, which uses amines, since ammonia is a high toxicity gas that is hard to handle, and, once combined with sulfate, does not allow regeneration thereof, whereas the amines can be handled in liquid form at ambient temperature and, chiefly, can be regenerated for reuse in the process.

SUMMARY

In an aspect, the present invention provides a process for treating liquid effluents and recovering metals with the precipitation of magnesium hydroxide by means of amines, followed by amine regeneration and utilization of the magnesium and sulphur sub-products.

For example, a process for treating liquid effluents and recovering metals comprises the steps of:
a) equalizing the liquid effluent;
b) adding sulfides and precipitating metals in the form of metal sulfidesulfides;
c) solid/liquid separation of the metal sulfides obtained in step (b) and forming a liquid phase free of metals;
d) adding amine solution in the ratio of 50 to 250 g/L —to the liquid phase, with magnesium precipitation in the form of hydroxide —Mg(OH)2; and
e) recovering the amine by depletion and rectification.

DETAILED DESCRIPTION

Figure 2:
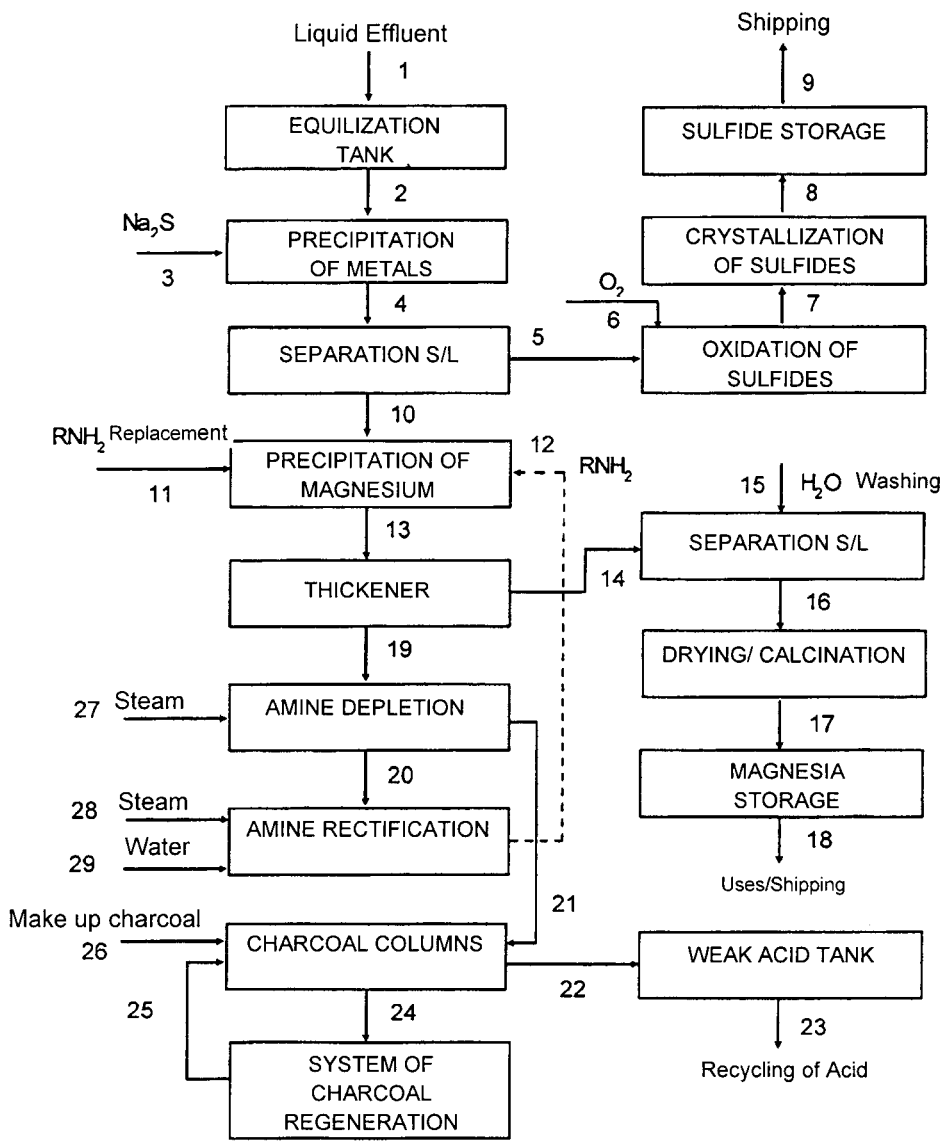

The present invention will next be described in greater detail based on a sample execution represented in the drawings. The drawings show:

FIG. 1—is a flowchart of the nickel production process by the HPAL route known in the state of the art; and FIG. 2—is a flowchart of the process for treating liquid effluents and recovering metals that is the object of the present invention.

DETAILED DESCRIPTION OF THE DRAWINGS

According to a preferred embodiment and, as can be seen in FIG. 2, the process for treating liquid effluents and recovering metals that is the object of the present invention was developed for recovering (i) magnesium and (ii) sulphur. The first one, to be recycled in the nick extraction hydrometallurgical process itself, for agricultural purposes (correctives and fertilizers) and as raw material for the industry, in general. The latter, in the form of diluted sulphuric acid, which can be recycled in the leaching process.

The process that is the object of this invention also enables the removal of metals remaining in the liquid effluent such as manganese (Mn), zinc (Zn), cobalt (Co), copper (Cu), among others, whereby creating conditions for them to be fully recycled in the industrial process, as well as providing an additional production of micronutrients for agricultural applications, among others.

As illustrated in the flowchart in FIG. 2, in the process of treating liquid effluents and recovering metals that is the object of this invention, the liquid effluent (1) is received in agitating tanks, for equalization. Thereafter, the homogenized (equalized) effluent (2) receives additions of sulfides (3), in the form of Na2S and/or H2S, for precipitation of the remaining metals such as Ni, Co, Mn, Zn, Cu, and others, in the form of metal sulfides (4). In the subsequent step, said sulfides are subject to a solid-liquid separation operation, resulting in a current rich in metal sulfides (5). Washed properly, the sulfides are oxidized in agitating reactors with oxygen injection (6) and the resulting solution (7) is subject to crystallization to obtain the respective salts (8), fractionated or mixed, which are stocked and sent for shipping (9).

The liquid phase or liquid effluent thus treated and virtually free of metals (10) is transferred to the reaction system, comprising agitating tanks, where it is contacted with low boiling point amines by means of the current of the recovered amine (12) and replacement amine (11), and the result of this reaction is a slurry of magnesium hydroxide precipitate (13). In this step, the amine is added at a rate of 50 to 250 g/L, at a temperature of 25 to 70° C., solid content of 1 to 10% w/w, residence time of 0.5 to 2 hours and recycle ratio of suspension of 5 to 40:1.

This slurry is forwarded to a thickener, the magnesium hydroxide is withdrawn by the underflow (14), transferred to a solid-liquid separation and washed with water (15), resulting in a magnesium hydroxide cake (16). Differently to processes already known in the state of the art, in the process that is the object of the present invention the magnesium hydroxide is precipitated separately, and then easily recovered using conventional solid/liquid separators.

In the sequence of operations, this cake is subjected to drying and calcination, the result being magnesia (17) is obtained, and stored, part being recycled to the process of nickel extraction and the remainder commercialized (18). In the reaction system, the amine/effluent ratio must be maintained in the range of 100 to 200 g/L, being optimized based on the content of magnesium solution. Part of the slurry of precipitated magnesium hydroxide is recirculated from the underflow of the thickener to the contacting reactors, in order to promote, by way of seeds, the growth of crystals of Mg(OH)2. The gas currents from the precipitation reactors and from drying the magnesium hydroxide are transferred to an amine absorption system, returning therefrom for reprocessing in the precipitation reactors.

The supernatant liquid phase of the thickener (19) follows to the amine recovery step, via distillation, in two steps, by depletion and, thereafter, by rectification.

The amine depletion is carried out by heating the weak acid solution containing amine (19) up to temperatures in the range of 90 to 120° C. with low pressure steam (27)—1.5 to 3.0 kgf/cm2 (man.)—fed continuously. It results in a tower bottom mass current (21) comprised of weak acid and traces of amine, which is transferred to activated charcoal columns, in order to remove the residual amounts of amine contained. The resulting weak acid (22) is transferred to the storage area, and from there (23) for reuse in the hydrometallurgical process. The saturated activated charcoal (24) follows to the regeneration step, after which (25) it is recomposed with the addition of new charcoal (26).

After the depletion step in the distillation, a current of amine-rich steams 20 follows to the rectification step, in which low pressure steam (28) is again injected in the distillation column (27), with pressures in the range of 1.5 to 3.0 kgf/cm2 (man.), fed continuously. Also in this equipment, the top steam currents are condensed by way of heat exchangers operating with cooling water (29), creating a reflux of 3 to 5:1 in relation to the production of high quality amine (12) in the distillation apparatus. The amine replacement current (11), jointly with the recovered amine current (12), are then fed into the precipitation reactors, closing the processing circuit.

EXAMPLE

Simulations tests of the process that is the object of the present invention, carried out on a laboratory scale, show the possibility of obtaining subproducts (recyclable solids) with commercial value and recovered acid water, suitable for reuse in the industrial process, which enables the condition of zero effluent to be achieved in terms of the emissions of liquid effluents. Said assays were conducted in a 500 ml beaker, adding a known volume of diethylamine in a known mass of the solution (MgSO4 aqueous, in a concentration of 30 g/L Mg). With the hydrolysis of water and the release of OH" to the solution, precipitation of Mg(OH)2 occurred. Table 2 shows the experimental results of the precipitation tests on magnesium hydroxide using diethylamine (Et2NH).

TABLE 2

Results of the precipitation tests on magnesium hydroxide

| Quantity of diethylamine in relation to stoichiometry (%) | Concentration of Mg remaining (g/L) | Recovery of Mg (%) |
|---|---|---|
| 0 | 18.00 | 0.0 |
| 50 | 9.90 | 42.7 |
| 75 | 6.50 | 60.2 |
| 100 | 1.90 | 87.8 |
| 125 | 0.17 | 98.9 |
| 150 | 0.09 | 99.4 |

As indicated by the results in Table 2, the increase in the amount of the diethylamine provided elevated removal of magnesium from the solution, as can be seen by the recovery of Mg. However, for additions of amine equal to 125 and 150% in relation to the stoichiometric mass of the cation Mg2+, there was no major variation in the recovery of magnesium.

The tests for recovering the amine were carried out in a laboratory distillator, coupled to a reactor-crystallizer, with the aim of recycling the amine, by fractionated distillation and recovery of Mg(OH)2. The reactor was heated by a bath with thermostat at the temperature of 70° C. A serpentine condenser was connected to the reactor. The condenser jacket was fed with water at 60° C., and recirculated by means of a peristaltic pump to keep the temperature constant. The gas amine followed for bubbling in a solution of H2S04 (10% (w/w). The acid solution, receiver of all the recovered amine, was subsequently analyzed for calculating the recovery of the organic reagent.

Throughout the entire experiment, an air current was inflated into the reactor. The pH of the solution was monitored during the entire experiment with the use of a digital reader. A ratio (amine/Mg) in an amount 50% higher than the stoichiometric value was used. Therefore, the mixture used in the distillation tests contained: 90 mg/L Mg; 71.1 g/L S042", 162.2 g/L Et2NH and pH=12. Each assay lasted for 3 hours. The average recovery of amine was equal to 99.6% and the final pH of the solution was equal to 5.5.

Table 3 shows the evolution of the quality of the liquid effluent during the course of the treatment process that is the object of this invention.

TABLE 3

Evolution of the quality of the effluent during the course of the treatment process

| Parameters | Unit | Effluent as is | Additions Precipitations | Effluent after removal of magnesium | Effluent after removal of amine | Effluent after removal of Organic Materials |
|---|---|---|---|---|---|---|
| Mg | g/L | 18.00 | | 9.10 | 0.11 | 0.11 |
| SO4 | g/L | 75.00 | | 66.17 | 74.78 | 74.84 |

TABLE 3-continued

Evolution of the quality of the effluent during the course of the treatment process

| Parameters | Unit | Effluent as is | Additions Precipitations | Effluent after removal of magnesium | Effluent after removal of amine | Effluent after removal of Organic Materials |
|---|---|---|---|---|---|---|
| Amine | g/L | | | 115.87 | 0.88 | 0.00 |
| pH | — | 6.5 | | 12 | 5.5 | 5.5 |
| Temperature | °C. | 27 | | 35 | 70 | 35 |
| Flows | | | | | | |
| effluent | m3/h | 1,000 | | 1,133 | 1,003 | 1002 |
| Mg | kg/h | 18,000 | | 110 | 110 | 110 |
| SO4 | kg/h | 75,000 | | 75,000 | 75,000 | 75,000 |
| amine | kg/h | | 131,328 | 131,328 | 878 | 0 |
| Mg(OH)2 pcpt | kg/h | | 44,726 | | | |
| water-washing | kg/h | | 36,594 | | | |

The following were obtained as subproducts (i) magnesium oxide—MgO—after calcination of Mg(OH)2, with quality suitable for reuse in the nickel extraction process, (ii) metal sulfides, as raw material for obtaining agricultural micronutrients and (ii) acid water, suitable for purposes of reuse in the industrial nickel extraction process.

The amine, main reagent of the present process, is recovered by means of evaporation, being recycled, which favors reduction of operating costs.

Additionally, another advantage of the process that is the object of this invention compared to processes already known in the state of the art is that the resulting sulfate solution, after passing through the charcoal columns, constitutes an acid solution which is also reused in the leaching process of the lateritic ore itself. Accordingly, magnesium and sulphur are recovered from the effluents containing these elements in a simple manner.

Another advantage of the present process lies in the fact that the Mg is recovered under the form of precipitated magnesium hydroxide, which can easily be recycled to the prior steps of the process, constituting an alternative for lower operating costs, when compared with current techniques from the state of the art. Consequently, the sulphur, as mentioned previously, is recovered in the acid water coming from the polishing operation in the charcoal columns. Accordingly, with a simpler flowchart and lower operating costs, amine is evaporated at lower temperatures, allowing recirculating to the operating of leaching the magnesium and the sulphur recovered in this step of the process.

In this sense, in general terms, the process for treating liquid effluents that is the object of the present invention presents new and inventive features compared to the state of the art:
a) use of low boiling point amines, substances generating alkaline conditions and easy to separate for purposes of recovery and recycling, which are applied directly to the solutions of effluents containing magnesium and sulfides;
b) removal of the soluble magnesium, originating from the acid solubilization of nikeliferrous laterite, in the form of precipitated Mg(OH)2 and the transformation thereof into magnesia, MgO, for purposes of reuse in the nickel extraction process itself and as raw material for agricultural and industrial applications;
c) transformation of the liquid effluent into low concentration acid water, with features that allow it to be reused in the processing circuit, providing operations in "zero effluent" condition, with a significant reduction in the consumption of replacement water in the industrial complex;
d) removal of the remaining metals in the liquid effluent (Co, Mn, Ni, Zn, Cu, etc.) and reuse thereof as raw material in the production of micronutrients for agricultural purposes;
e) widening of the use of the other mineral resources associated to nickel; and
f) additionally, this process of treating liquid effluents has major operational flexibility and can be implemented in a modular way.

Having described an example of a preferred embodiment, it should be understood that the scope of the present invention covers other possible variations, being limited solely by the content of the accompanying claims, potential equivalent means being included therein.

The invention claimed is:

1. A process for treating liquid effluents and recovering metals, comprising the steps of:
   a) equalizing a liquid effluent;
   b) adding sulfides and metal precipitation in the form of metal sulfides;
   c) separating solid/liquid from the metal sulfides obtained in step (b) and forming a liquid phase free of metals;
   d) adding amine solution comprising amine at a rate of 50 to 250 g/L to the liquid phase to produce a slurry comprising magnesium hydroxide —Mg(OH)$_2$; and
   e) recovering the amine by depletion and rectification.

2. The process of claim 1, wherein in step (d) adding the amine solution to the liquid phase occurs at a temperature of 25 to 70° C., solid content of 1 to 10% w/w, and residence time of 0.5 to 2 hours.

3. The process of claim 1, wherein in step (d) the amine added comes from currents of recovered amine and replacement amine.

4. The process of claim 1, wherein after step (d) and before step (e) the slurry comprising magnesium hydroxide is conducted to a thickener.

5. The process of claim 4, wherein magnesium hydroxide is withdrawn from the thickener, transferred to a solid/liquid separator and washed with water.

6. The process of claim 5, wherein the washed magnesium hydroxide is subject to a step of drying and calcination forming magnesia.

7. The process of claim 5, wherein in step (e), the amine depletion comprises:

heating the thickener after the magnesium hydroxide is removed by low pressure steam to obtain i) a mass current comprising weak acids and traces of amide and ii) a current of amine-rich steams.

8. The process of claim 7, wherein the mass current comprising the weak acids and the traces of amide is transferred to activated charcoal columns, in which residual amine is removed and resulting weak acids are transferred for storage.

9. The process of claim 7, further comprising sending the current of amine-rich steams to the rectification step, heating with a low pressure steam current and condensing through heat exchangers to produce high quality recovered amine.

10. The process of claim 7, wherein the pressure of the low pressure steam is 1 to 10 $kgf/cm^2$.

* * * * *